(12) United States Patent
Marcus

(10) Patent No.: US 8,543,303 B2
(45) Date of Patent: Sep. 24, 2013

(54) ANTI-ROLLBACK CONTROL SYSTEM FOR HYBRID AND CONVENTIONAL POWERTRAIN VEHICLES

(75) Inventor: Essam Tawfik Marcus, Morrisville, NC (US)

(73) Assignee: Rollfree Tek, LLC, Morrisville, NC (US)

( * ) Notice: Subject to any disclaimer, the term of this patent is extended or adjusted under 35 U.S.C. 154(b) by 219 days.

(21) Appl. No.: 13/019,289

(22) Filed: Feb. 1, 2011

(65) Prior Publication Data
US 2011/0184615 A1 Jul. 28, 2011

(51) Int. Cl.
G06F 19/00 (2011.01)

(52) U.S. Cl.
USPC .......................................... 701/58

(58) Field of Classification Search
USPC .......................................... 701/58
See application file for complete search history.

(56) References Cited

U.S. PATENT DOCUMENTS

| | | | |
|---|---|---|---|
| 4,650,046 A | 3/1987 | Parsons | |
| 4,660,691 A | 4/1987 | Messersmith et al. | |
| 4,667,471 A | 5/1987 | Fulmer et al. | |
| 4,676,354 A | 6/1987 | Janiszewski et al. | |
| 4,915,131 A | 4/1990 | Cha | |
| 5,376,869 A | 12/1994 | Konrad | |
| 5,452,946 A | 9/1995 | Warner | |
| 5,474,164 A | 12/1995 | Berger | |
| 5,820,515 A | 10/1998 | Fukaya et al. | |
| 5,935,041 A | 8/1999 | Tsukamoto et al. | |
| 6,021,880 A | 2/2000 | Reed, Jr. et al. | |
| 6,427,108 B1* | 7/2002 | Kanasugi et al. | 701/51 |
| 6,510,838 B2 | 1/2003 | Hur | |
| 6,814,414 B1 | 11/2004 | Schmitt et al. | |
| 6,851,333 B2 | 2/2005 | Apel et al. | |
| 7,051,859 B2 | 5/2006 | Yurgil et al. | |
| 7,136,735 B2 | 11/2006 | Carlson et al. | |
| 7,166,060 B2 | 1/2007 | Jlang et al. | |
| 7,226,389 B2 | 6/2007 | Steen et al. | |
| 7,430,935 B2 | 10/2008 | Ohnemus | |
| 7,509,202 B2 | 3/2009 | Scelers | |
| 7,516,007 B2 | 4/2009 | Tamai et al. | |
| 7,556,587 B2 | 7/2009 | Jiang et al. | |
| 7,600,827 B2 | 10/2009 | Tamai et al. | |
| 2004/0113489 A1* | 6/2004 | Iwagawa et al. | 303/155 |
| 2005/0067896 A1* | 3/2005 | Kim et al. | 303/191 |
| 2007/0073466 A1* | 3/2007 | Tamai et al. | 701/70 |
| 2008/0125944 A1* | 5/2008 | Kamishima et al. | 701/54 |
| 2009/0048063 A1* | 2/2009 | Silveri et al. | 477/3 |

* cited by examiner

Primary Examiner — Thomas Tarcza
Assistant Examiner — Maceeh Anwari

(57) ABSTRACT

The present invention provides an anti-rollback control system for use in a motor vehicle, having a powertrain which includes an ICE and/or an electric motor, and an automatic or automated transmission system, for preventing undesired rolling of said vehicle on an incline. Said anti-rollback control system comprises: a tilt sensor; a sensor that detects the selected transmission's operating mode; operator-independent accelerator pedal position-adjusting device; and an accelerator pedal control module. The control module receives signals from the sensors, process said signals, and send instructions accordingly to said operator-independent accelerator pedal position-adjusting device to move the accelerator pedal to a predetermined position according to which the vehicle's powertrain generates a preset amount of mechanical power sufficient to create a force, in the intended direction of movement of the vehicle, equivalent to, or bigger than, the gravitational force tending to roll the vehicle in an unwanted direction.

27 Claims, 10 Drawing Sheets

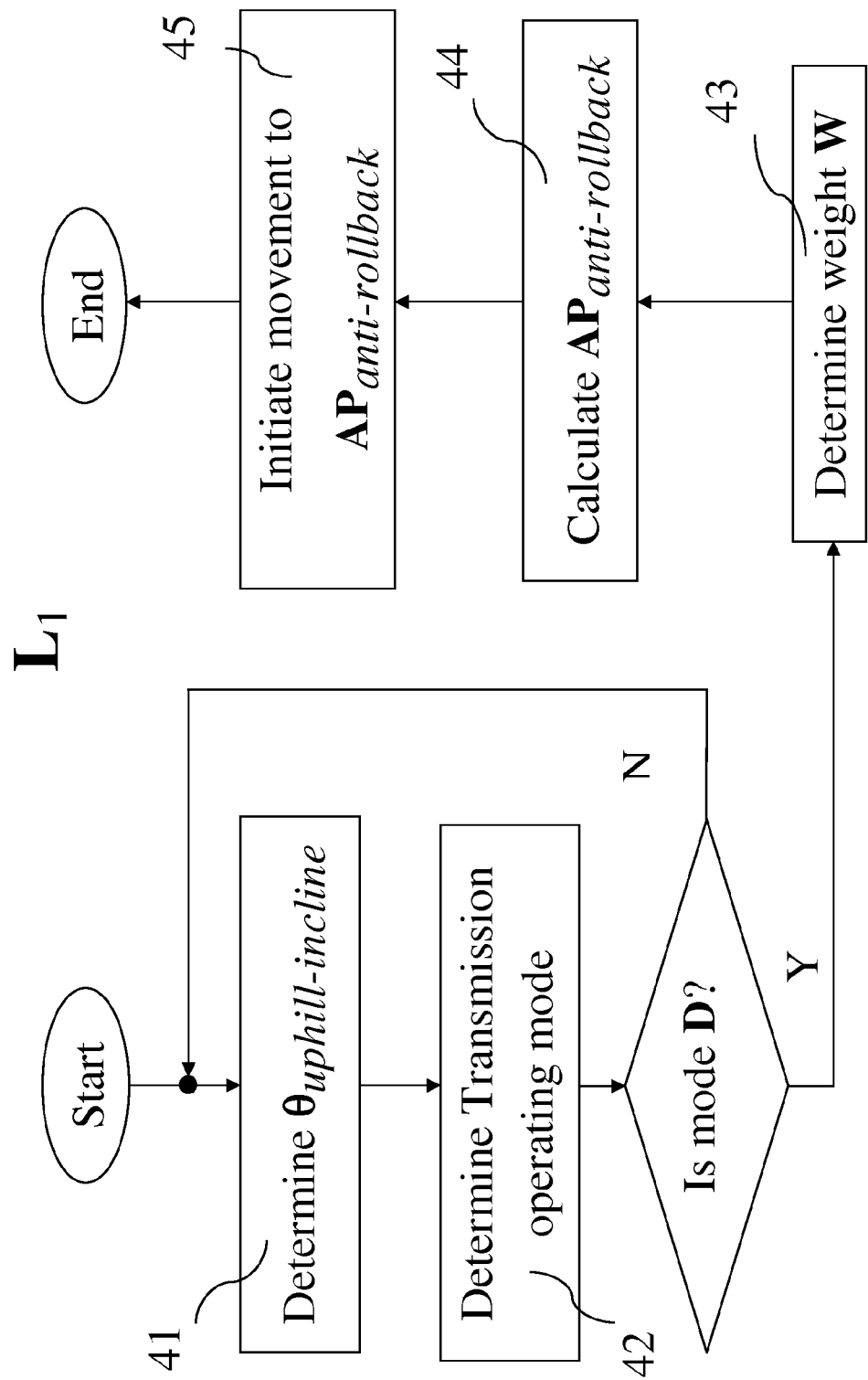
FIG. 4-a

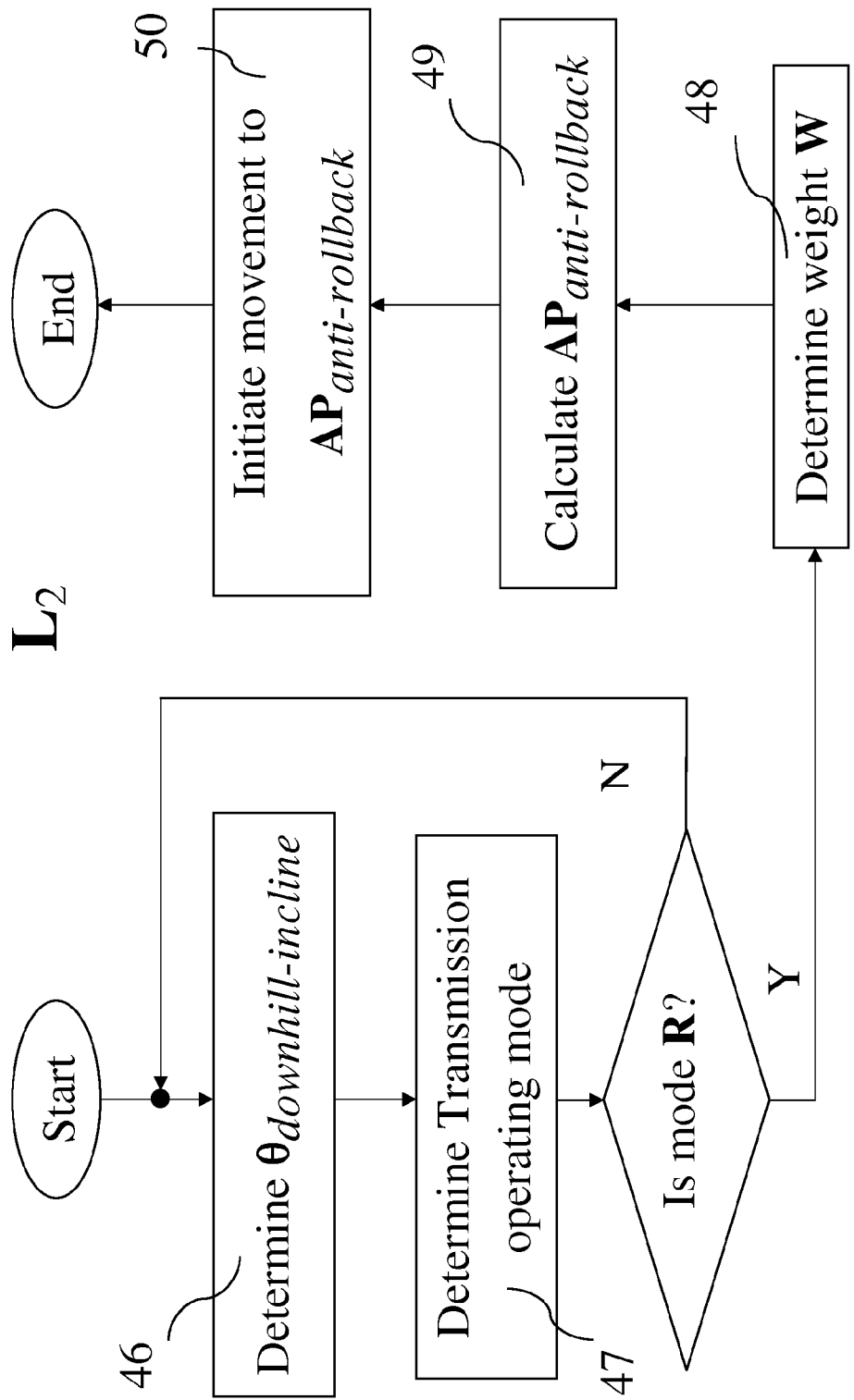
FIG. 4-b

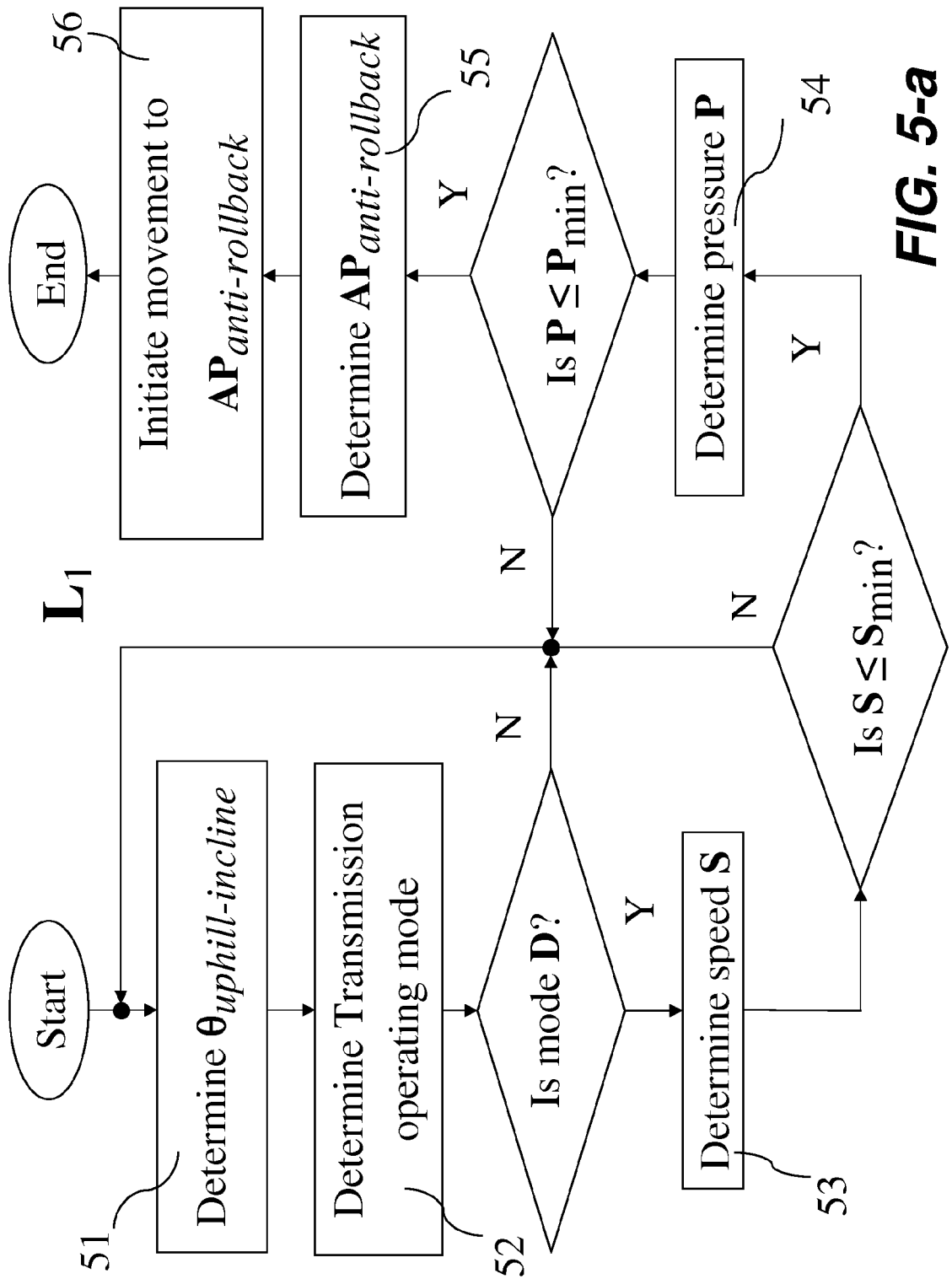
FIG. 5-a

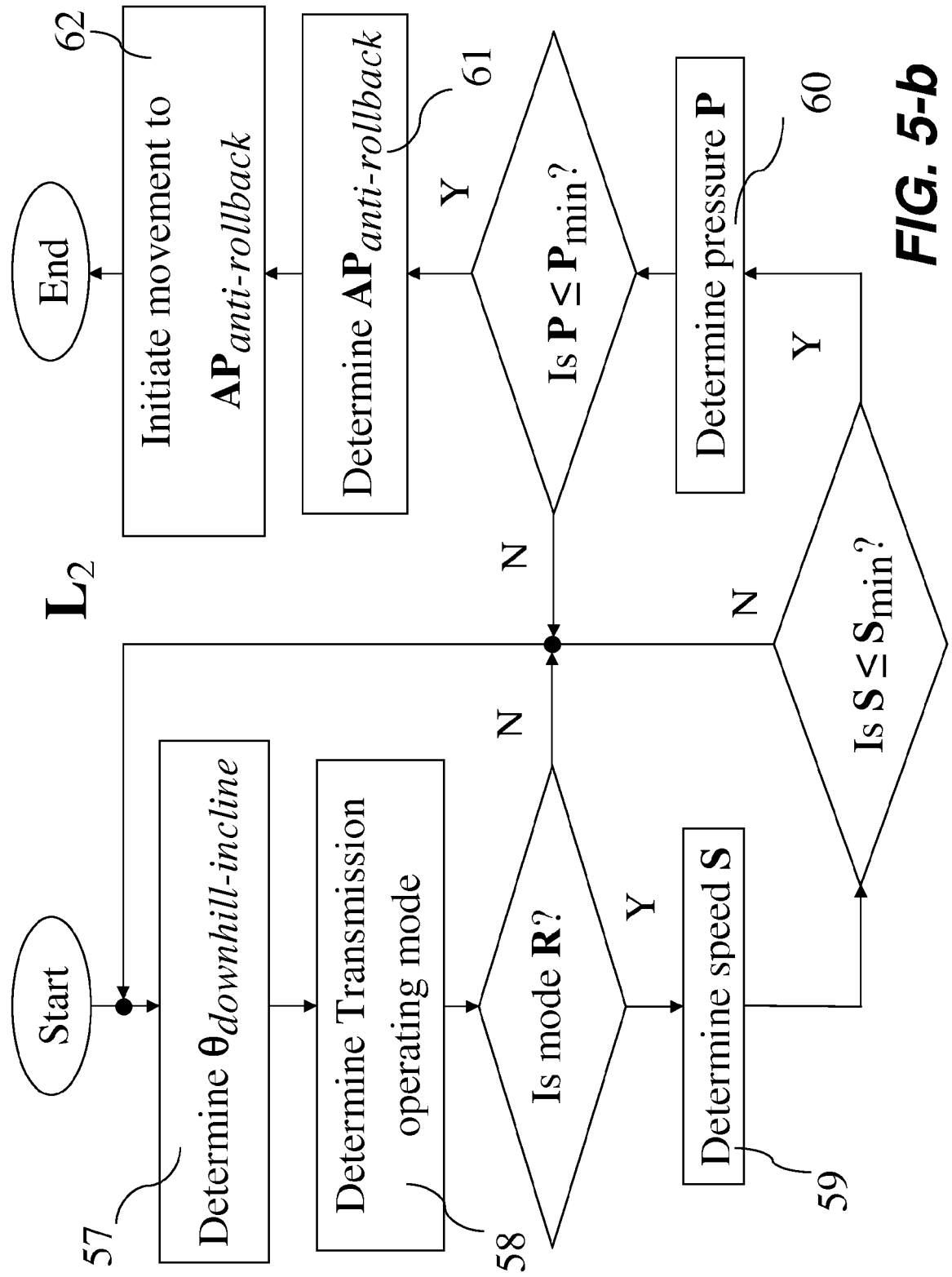
FIG. 5-b

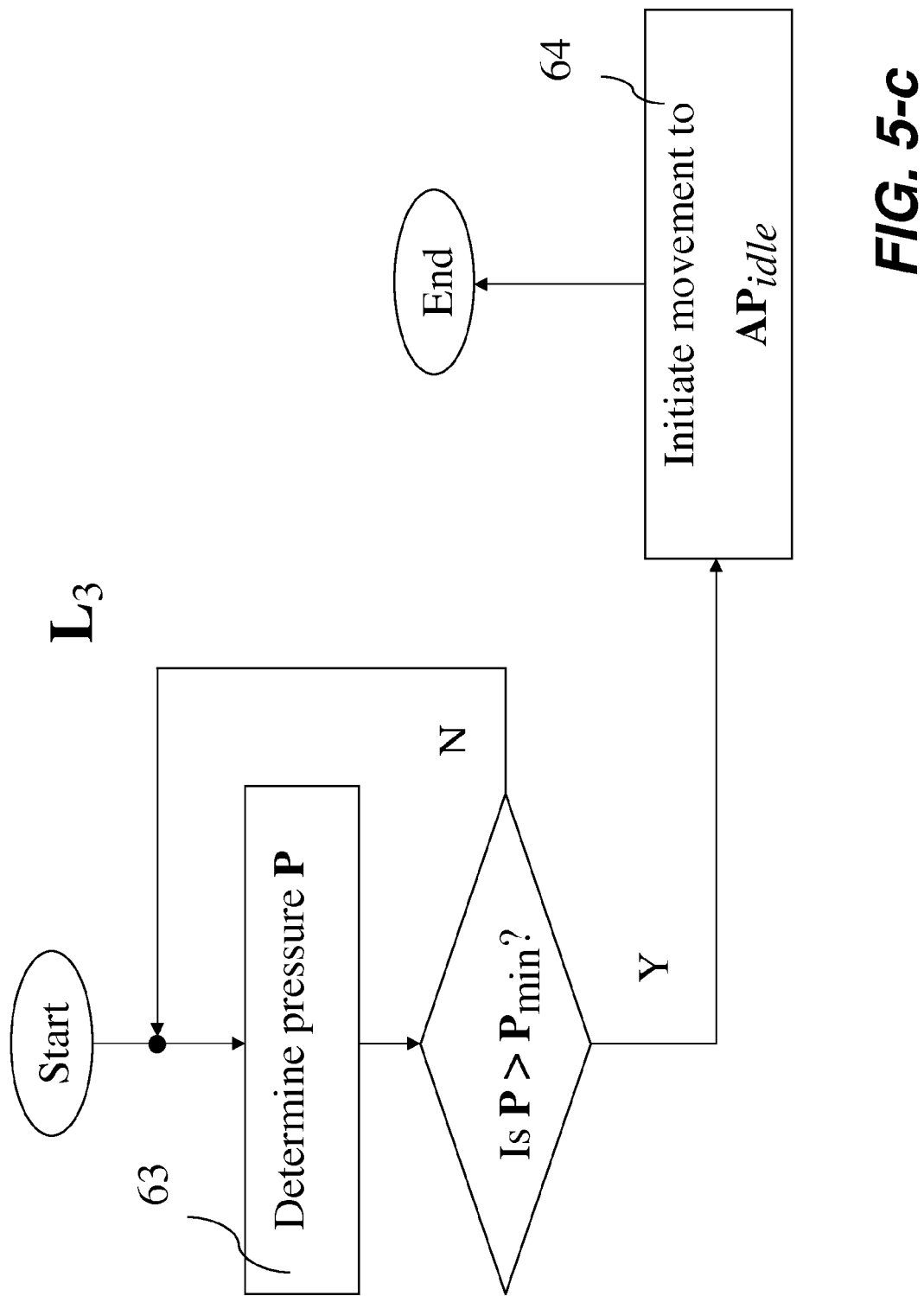
FIG. 5-c

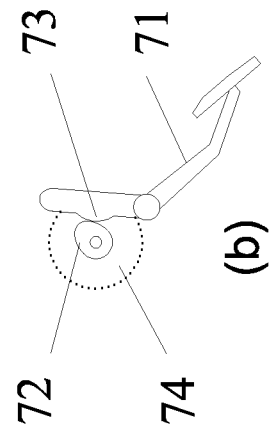
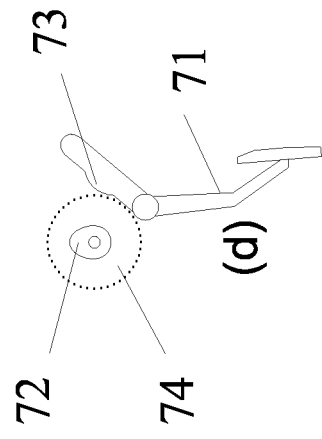
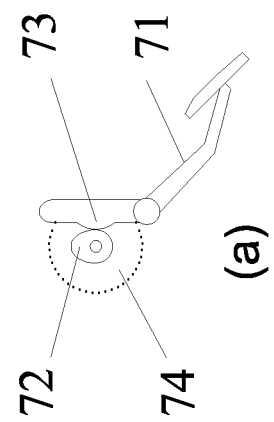
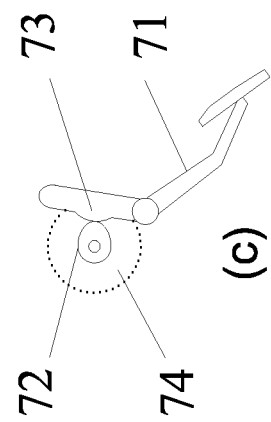
FIG. 6

ANTI-ROLLBACK CONTROL SYSTEM FOR HYBRID AND CONVENTIONAL POWERTRAIN VEHICLES

TECHNICAL FIELD

The present invention relates to an anti-rollback control system, and more particularly, to an anti-rollback control system for use in a hybrid or a conventional powertrain vehicle having an automatic or an automated transmission system, to prevent undesired rolling of the vehicle on launching it on an incline.

BACKGROUND ART

A typical problem that is encountered by motor vehicle operators, when they find themselves stopped on an incline and want to begin/resume moving again, is that the vehicle begins to roll in a direction opposite to the intended direction of vehicle movement when the operator does not responsively apply the accelerator pedal, with the rollback distance being a function of how quickly the operator transitions from depressing the brake pedal to applying the accelerator pedal.

In a vehicle having an automatic transmission, the powertrain is typically designed to provide a minimum amount of torque when the engine is running idle, which is referred to as creep torque. Although said creep torque prevents such a vehicle from rolling back on an incline having an angle of inclination of less than +8 degrees, yet as the amount of creep torque can't be increased practically above a certain limit to avoid increasing the rate of gas consumption by the engine on idling, and to avoid excessive acceleration of the vehicle on starting it on a level, so creep torque generally fails to prevent the vehicle from rolling back on an incline having an angle of inclination bigger than +8 degrees.

In Hybrid vehicles, and other vehicles with automated transmission systems, as the internal combustion engine and/or the electric motor is typically stopped when the vehicle is at rest, to reduce fuel and/or electric current consumption, so no creep torque is generated. This makes these vehicles susceptible for rolling back on launching them on inclines having smaller angles of inclination.

The prior art includes various systems and methods to prevent undesired rolling of a vehicle on launching it on an incline. One system, executed on a vehicle having a powertrain including an automatic transmission, senses vehicle roll via transmission sensors and engages a third clutching element in the automatic transmission to hold the transmission-output shaft from turning, and thus preventing vehicle rollback. A second system senses vehicle roll via wheel speed sensors or transmission sensors, and modulates the engine throttle to increase torque output of the powertrain to hold the vehicle stationary on a grade or to apply regenerative torque to resist the backward motion. Although these systems may accomplish the task of preventing vehicle rollback, yet their performance is unacceptable as they need the vehicle to actually start rolling back before they are activated, and due to the presence of a time lag between their activation and their actual stopping of the vehicle's rolling.

A third system senses the angle of inclination via inclinometers, grade sensors, or accelerometers, and modulates the amount of brake force applied to one or several vehicle wheels till enough torque is generated by the vehicle's engine and/or electric motor to resist the gravitational force tending to move the vehicle in a direction opposite to the intended direction of vehicle movement. Although this system may offer fairly acceptable performance, yet as operating this system requires applying the brake force while the powertrain is being accelerated, so it results in shortening the service life of various components of the brake system. Also, as this system requires alternations in the design of the brake system, and necessitates the use of complex control strategies, so it is undesirably expensive to design, manufacture, and maintain.

A fourth system, which is disclosed in U.S. Pat. No. 7,516,007 provides a method for reducing rollback of a vehicle having an engine, wherein said method comprises: determining a grade; receiving a brake signal; calculating a brake release rate based on said brake signal; starting said engine based on said grade and said brake release rate; and setting an engine target RPM based on said grade to hold said vehicle without rollback when said vehicle is stopped and to creep said vehicle forward when said engine is started. Although the performance of this method would be superior to all previously disclosed anti-rollback methods and systems, yet as it relies on the vehicle's central control module for processing signals received from grade sensors, brake sensors, accelerator sensors, as well as all other powertrain components and performance sensors, so this adds a lot of complexity to the design and programming of said central control module, which makes the system undesirably expensive to produce and maintain, and makes it more prone to malfunctions during operation as a result of software errors.

Thus, there is still a need for an anti-rollback control system for use in hybrid and conventional powertrain vehicles having automatic or automated transmission systems, to prevent undesired rolling of said vehicles on launching them on inclines, with said anti-rollback control system being simple to design, economic to manufacture and maintain, and less prone to malfunctions during operation.

BRIEF SUMMARY OF THE INVENTION

The present invention provides an anti-rollback control system for use in a hybrid or a conventional powertrain vehicle having an automatic or an automated transmission system, to prevent undesired rolling of said vehicle on launching it on an incline, with said anti-rollback control system being simple to design, economic to manufacture and maintain, and having a relatively simple mode of action which makes it less prone to malfunctions during operation.

As used herein, the term "module" refers to an application specific integrated circuit (ASIC), an electronic circuit, a processor (shared, dedicated, or group) and memory that execute one or more software or firmware programs, a combinational logic circuit, and/or other suitable components that provide the described functionality; the term "horizontal plane" refers to a plane perpendicular to the direction of the gravitational force at a given point; the term "uphill incline" refers to an incline on which a vehicle is oriented so that its leading end is facing upward, with the level of the horizontal plane on which the leading end of the vehicle lies being higher than the level of the horizontal plane on which the trailing end of the vehicle lies; the term "downhill incline" refers to an incline on which a vehicle is oriented so that its leading end is facing downward, with the level of the horizontal plane on which the leading end of the vehicle lies being lower than the level of the horizontal plane on which the trailing end of the vehicle lies; the term "automatic transmission system" refers to and includes any automatic gearbox that includes a torque convertor, and which is used to change the gear ratios automatically as the vehicle moves; the term "automated transmission system" refers to and includes any automatic gearbox that doesn't includes a torque convertor, and which is used to change the gear ratios automatically as the vehicle moves, with non limiting examples including: continuous variable transmissions (CVTs) and semi-automatic transmissions; the term "operating mode of a transmission system" refers to any one of a transmission system's operating modes "P-R-N-D-L" selected by the vehicle operator, which refer to "Park, Reverse, Neutral, Drive, and Low gear" operating modes respectively; and the term "tilt sensor" refers to and includes any device used for measuring the angle of inclination between two planes, or the angle of inclination between an axis and a plane, with non limiting examples including: inclinometers, grade sensors, and accelerometers.

Accordingly, in a motor vehicle having a powertrain which includes an ICE (internal combustion engine) and/or an electric motor, and an automatic or automated transmission system, with the amount of fuel supplied to said ICE and/or the amount of electric power delivered to said electric motor, and hence the amount of mechanical power generated by said powertrain, being a function of the position of at least one movable component of an accelerator pedal assembly, the present invention provides an anti-rollback control system for preventing undesired rolling of said motor vehicle in a direction opposite to an intended direction of vehicle movement on beginning or resuming the movement of the vehicle after stopping the vehicle on an incline.

In a preferred embodiment, the anti-rollback control system comprises: at least one tilt sensor that measures the angle of inclination of the vehicle's longitudinal axis with reference to the horizontal plane and generates signals accordingly; at least one sensor that detects the selected operating mode of the vehicle's transmission system and generates signals accordingly; an accelerator pedal control module; and an operator-independent accelerator pedal position-adjusting device that includes a stepper motor, and that is operable to cause controlled movement of at least one movable component of the vehicle's accelerator pedal assembly in response to and in accordance with instructions received from the said accelerator pedal control module, with the accelerator pedal control module being configured for receiving the signals generated by said tilt sensor and said sensor for detecting the selected operating mode of the transmission system, processing said received signals, and sending instructions accordingly to the said operator-independent accelerator pedal position-adjusting device to move the said at least one movable component of the accelerator pedal assembly to a predetermined position according to which a preset amount of fuel is supplied to said ICE and/or a preset amount of electric power is delivered to said electric motor, and hence a preset amount of mechanical power is generated by said powertrain, with said preset amount of mechanical power being sufficient to create a force, in the intended direction of movement of the vehicle, equivalent to, or bigger than, the gravitational force tending to roll the vehicle in a direction opposite to the intended direction of vehicle movement.

In one feature, the said anti-rollback control system further comprises at least one sensor that detects the position of the vehicle's brake pedal and sends signals accordingly to said accelerator pedal control module, with said accelerator pedal control module being configured to begin sending the said instructions to the said operator-independent accelerator pedal position-adjusting device once the brake pedal reaches a predetermined position. In a preferred embodiment, the accelerator pedal control module is configured to begin sending the said instructions once the vehicle's operator begins to release the brake pedal. In another preferred embodiment, the brake pedal position at which the accelerator pedal control module is configured to begin sending said instructions is determined in correlation with the said measured angle of inclination. In yet another preferred embodiment, the accelerator pedal control module is configured to send signals to move the operator-independent accelerator pedal position-adjusting device to its idle position once the brake pedal reaches a predetermined position.

In another feature, the said anti-rollback control system further comprises at least one sensor that detects the pressure of a working fluid within the vehicle's brake system at at least one point and sends signals accordingly to said accelerator pedal control module, with said accelerator pedal control module being configured to begin sending the said instructions to the said operator-independent accelerator pedal position-adjusting device once the pressure of the said fluid within the vehicle's brake system drops to a predetermined level. In a preferred embodiment, the said predetermined pressure level of the said fluid within the vehicle's brake system at which said accelerator pedal control module is configured to begin sending said instructions to the operator-independent accelerator pedal position-adjusting device is determined in correlation with the said measured angle of inclination. In yet another preferred embodiment, the accelerator pedal control module is configured to send signals to move the said operator-independent accelerator pedal position-adjusting device to its idle position once the pressure of the said fluid within the vehicle's brake system reaches a predetermined level.

Still in another feature, the said anti-rollback control system further comprises at least one sensor for generating a signal indicative of the speed of said vehicle and sending signals accordingly to said accelerator pedal control module, with said accelerator pedal control module being configured for processing the received signals, along with said signals received from said tilt sensor and said sensor for detecting the selected operating mode of the transmission system, and sending instructions accordingly to the said operator-independent accelerator pedal position-adjusting device. In a preferred embodiment, the accelerator pedal control module is configured to send the said instructions when the speed of the vehicle is below a predetermined speed, and stops sending the said instructions once the speed of the vehicle exceeds the said predetermined speed.

In yet another feature, the vehicle's maximum loading weight is being taken into account while processing said received signals by said accelerator pedal control module.

In still another feature, the said anti-rollback control system further comprises at least one weight measuring device that measures the weight of said vehicle and sends signals accordingly to said accelerator pedal control module, with said accelerator pedal control module being configured for processing the received signals, along with said signals received from said tilt sensor and said sensor for detecting the selected operating mode of the transmission system, and sending instructions accordingly to the said operator-independent accelerator pedal position-adjusting device. In a preferred embodiment, the said weight measuring device is one, or more than one, load cell positioned at any point underneath the vehicle's body.

Also, in another feature, the said accelerator pedal control module is a multi-task module. In yet another feature, the said signals generated by the tilt sensor and received by the accelerator pedal control module are repeated at equal intervals, to accommodate for any changes in the signals generated by any of the other before mentioned sensors.

In a preferred embodiment, the said operator-independent accelerator pedal position-adjusting device includes: a cam and follower mechanism; and a stepper motor, with the said follower being incorporated within a movable component of the accelerator pedal assembly so that the movement of the follower is directly transmitted to the movable component(s) of the accelerator pedal assembly, and with the movement of the said cam and follower mechanism, and hence the movement of the movable component(s) of the accelerator pedal assembly, being controlled by the said stepper motor in accordance with said instructions sent by said accelerator pedal control module.

In a preferred embodiment, the said anti-rollback control system of the present invention is used to prevent undesired rolling of a motor vehicle on launching it on an incline, wherein the amount of fuel supplied to the ICE and/or the amount of electric power delivered to the electric motor of the said vehicle, and hence the amount of mechanical power generated by its powertrain, is a function of the position of a movable component of the vehicle's accelerator pedal assembly. In this preferred embodiment, the anti-rollback control system is constructed so that the said component of the accelerator pedal assembly is movable by the operator-independent accelerator pedal position-adjusting device of the anti-rollback control system, in accordance with said instructions sent by said accelerator pedal control module. Accordingly, in this preferred embodiment, the operator-independent accelerator pedal position-adjusting device of the said anti-rollback control system includes: a cam and follower mechanism; and a stepper motor, with the said follower being incorporated within the said movable component of the accelerator pedal assembly so that the movement of the follower is directly transmitted to the said component, and with the movement of the said cam and follower mechanism, and hence the movement of the said movable component of the accelerator pedal assembly, being controlled by the said stepper motor in accordance with said instructions sent by said accelerator pedal control module.

The anti-rollback control system of the present invention is applicable to any motor vehicle having an automatic transmission or an automated transmission regardless of the type of accelerator pedal included in it. Accordingly, in a preferred embodiment, the said accelerator pedal is a pendant-type accelerator pedal. In another preferred embodiment, the said accelerator pedal is an organ-type accelerator pedal.

Also, the anti-rollback control system of the present invention is functional for preventing undesired backward rolling of said vehicle on beginning or resuming its forward movement after stopping the said vehicle on an uphill incline, as well as preventing undesired forward rolling of said vehicle on beginning or resuming its backward movement after stopping the said vehicle on a downhill incline.

In another feature, the anti-rollback control system of the present invention is operable for preventing undesired rolling of a motor vehicle having an automatic transmission or an automated transmission on beginning or resuming the movement of said vehicle after stopping it on anyone of a number of inclines, with each of the said inclines having a different angle of inclination. In a preferred embodiment, each individual angle of inclination measured by the said tilt sensor, on operating the vehicle on each of the said inclines, is being correlated with a different set of instructions sent by said accelerator pedal control module. In another preferred embodiment, the angles of inclinations of the said inclines are functionally grouped into at least one range of angles, with each individual angle of inclination measured by the said tilt sensor, on operating the vehicle on each of the said inclines, being correlated with a predetermined set of instructions sent by said accelerator pedal control module based on the range of angles within which said measured angle of inclination lies.

The present invention also provides a method for preventing undesired rolling of a motor vehicle having a powertrain which includes an ICE (internal combustion engine) and/or an electric motor, and an automatic or an automated transmission system, with the amount of fuel supplied to said ICE and/or the amount of electric power delivered to said electric motor, and hence the amount of mechanical power generated by said powertrain, being a function of the position of at least one movable component of an accelerator pedal assembly, and with the said method being operable for preventing undesired rolling of the said vehicle in a direction opposite to an intended direction of vehicle movement on beginning or resuming the movement of the said vehicle after stopping the vehicle on an incline. Said method comprises: providing operator-independent accelerator pedal position-adjusting device that includes a stepper motor, and that is operable to cause controlled movement of at least one movable component of the vehicle's accelerator pedal assembly in response to and in accordance with instructions received from a control module; measuring the angle of inclination of the vehicle's longitudinal axis with reference to the horizontal plane and generating signals accordingly; detecting the selected operating mode of said transmission system and generating signals accordingly; processing said generated signals; and sending instructions accordingly to the said provided operator-independent accelerator pedal position-adjusting device to move the said at least one movable component of the vehicle's accelerator pedal assembly to a predetermined position according to which a predetermined corresponding amount of mechanical power is generated by the vehicle's powertrain, with said predetermined amount of mechanical power being sufficient to create a force, in the intended direction of movement of the vehicle, equivalent to, or bigger than, the gravitational force tending to roll the vehicle in a direction opposite to the intended direction of vehicle movement.

In one feature, the said method further comprises detecting the position of the vehicle's brake pedal and generating signals accordingly, with said generated signals being processed along with said signals generated in correlation with said measured angle of inclination of the vehicle and said signals generated in correlation with said selected operating mode of the transmission system, and with said sent instructions being configured accordingly.

In another feature, the said method further comprises detecting the pressure within the vehicle's brake system and generating signals accordingly, with said generated signals being processed along with said signals generated in correlation with said measured angle of inclination of the vehicle and said signals generated in correlation with said selected operating mode of the transmission system, and with said sent instructions being configured accordingly.

In yet another feature, the said method further comprises measuring the speed of the said vehicle and generating signals accordingly, with said generated signals being processed along with said signals generated in correlation with said measured angle of inclination of the vehicle and said signals generated in correlation with said selected operating mode of the transmission system, and with said sent instructions being configured accordingly.

In still another feature, the said method further comprises measuring the weight of the vehicle and generating signals accordingly, with said generated signals being processed along with said signals generated in correlation with said measured angle of inclination of the vehicle and said signals generated in correlation with said selected operating mode of the transmission system, and with said sent instructions being configured accordingly.

Further areas of applicability of the present invention will become apparent from the detailed description provided hereinafter. It should be understood that the detailed description and specific examples, while indicating the preferred embodiment of the invention, are useful for purposes of illustration only and are not intended to limit the scope of the invention.

BRIEF DESCRIPTION OF THE DRAWINGS

The description of the objects, features and advantages of the present invention will be more fully appreciated by reference to the following detailed description of the exemplary embodiments in accordance with the accompanying drawings, wherein:

FIG. 4-a and FIG. 4-b are flowcharts illustrating exemplary steps executed by the layers of a multi-task accelerator pedal control module in accordance with the present invention;

FIG. 5-a, FIG. 5-b, and FIG. 5-c are flowcharts illustrating exemplary steps executed by the layers of another multi-task accelerator pedal control module in accordance with the present invention;

FIG. 6 is a functional block diagram of a pendant-type accelerator pedal in a plurality of exemplary operating positions in accordance with the anti-rollback control system of the present invention.

DETAILED DESCRIPTION OF THE INVENTION

Figure 1:
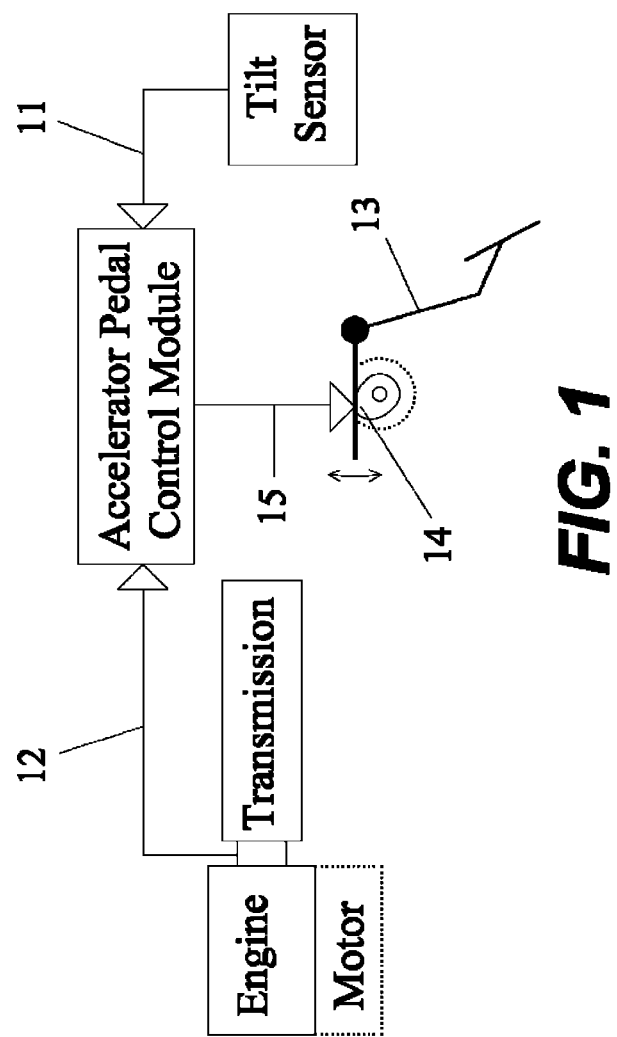
FIG. 1 is a functional block diagram of a vehicle including a preferred embodiment of an anti-rollback control system in accordance with the present invention.

The present invention provides an anti-rollback control system for use in a hybrid or a conventional powertrain vehicle having an automatic or an automated transmission system, to prevent undesired rolling of said vehicle on launching it on an incline, with said anti-rollback control system being simple to design, economic to manufacture and maintain, and having a relatively simple mode of action which makes it less prone to malfunctions during operation.

As used herein, the term "module" refers to an application specific integrated circuit (ASIC), an electronic circuit, a processor (shared, dedicated, or group) and memory that execute one or more software or firmware programs, a combinational logic circuit, and/or other suitable components that provide the described functionality; the term "horizontal plane" refers to a plane perpendicular to the direction of the gravitational force at a given point; the term "uphill incline" refers to an incline on which a vehicle is oriented so that its leading end is facing upward, with the level of the horizontal plane on which the leading end of the vehicle lies being higher than the level of the horizontal plane on which the trailing end of the vehicle lies; the term "downhill incline" refers to an incline on which a vehicle is oriented so that its leading end is facing downward, with the level of the horizontal plane on which the leading end of the vehicle lies being lower than the level of the horizontal plane on which the trailing end of the vehicle lies; the term "automatic transmission system" refers to and includes any automatic gearbox that includes a torque convertor, and which is used to change the gear ratios automatically as the vehicle moves; the term "automated transmission system" refers to and includes any automatic gearbox that doesn't includes a torque convertor, and which is used to change the gear ratios automatically as the vehicle moves, with non limiting examples including: continuous variable transmissions (CVTs) and semi-automatic transmissions; the term "operating mode of a transmission system" refers to any one of a transmission system's operating modes "P-R-N-D-L" selected by the vehicle operator, which refer to "Park, Reverse, Neutral, Drive, and Low gear" operating modes respectively; and the term "tilt sensor" refers to and includes any device used for measuring the angle of inclination between two planes, or the angle of inclination between an axis and a plane, with non limiting examples including: inclinometers, grade sensors, and accelerometers.

Accordingly, in a motor vehicle having a powertrain which includes an ICE (internal combustion engine) and/or an electric motor, and an automatic or automated transmission system, with the amount of fuel supplied to said ICE and/or the amount of electric power delivered to said electric motor, and hence the amount of mechanical power generated by said powertrain, being a function of the position of at least one movable component of an accelerator pedal assembly, the present invention provides an anti-rollback control system for preventing undesired rolling of said motor vehicle in a direction opposite to an intended direction of vehicle movement on beginning or resuming the movement of the vehicle after stopping the vehicle on an incline.

In a preferred embodiment, the anti-rollback control system comprises: at least one tilt sensor that measures the angle of inclination of the vehicle's longitudinal axis with reference to the horizontal plane and generates signals accordingly; at least one sensor that detects the selected operating mode of the vehicle's transmission system and generates signals accordingly; an accelerator pedal control module; and an operator-independent accelerator pedal position-adjusting device that includes a stepper motor, and that is operable to cause controlled movement of at least one movable component of the vehicle's accelerator pedal assembly in response to and in accordance with instructions received from the said accelerator pedal control module, with the accelerator pedal control module being configured for receiving the signals generated by said tilt sensor and said sensor for detecting the selected operating mode of the transmission system, processing said received signals, and sending instructions accordingly to the said operator-independent accelerator pedal position-adjusting device to move the said at least one movable component of the accelerator pedal assembly to a predetermined position according to which a preset amount of fuel is supplied to said ICE and/or a preset amount of electric power is delivered to said electric motor, and hence a preset amount of mechanical power is generated by said powertrain, with said preset amount of mechanical power being sufficient to create a force, in the intended direction of movement of the vehicle, equivalent to, or bigger than, the gravitational force tending to roll the vehicle in a direction opposite to the intended direction of vehicle movement.

In one feature, the said anti-rollback control system further comprises at least one sensor that detects the position of the vehicle's brake pedal and sends signals accordingly to said accelerator pedal control module, with said accelerator pedal control module being configured to begin sending the said instructions to the said operator-independent accelerator pedal position-adjusting device once the brake pedal reaches a predetermined position. In a preferred embodiment, the accelerator pedal control module is configured to begin sending the said instructions once the vehicle's operator begins to release the brake pedal. In another preferred embodiment, the brake pedal position at which the accelerator pedal control module is configured to begin sending said instructions is determined in correlation with the said measured angle of inclination. In yet another preferred embodiment, the accelerator pedal control module is configured to send signals to move the operator-independent accelerator pedal position-adjusting device to its idle position once the brake pedal reaches a predetermined position.

In another feature, the said anti-rollback control system further comprises at least one sensor that detects the pressure of a working fluid within the vehicle's brake system at at least one point and sends signals accordingly to said accelerator pedal control module, with said accelerator pedal control module being configured to begin sending the said instructions to the said operator-independent accelerator pedal position-adjusting device once the pressure of the said fluid within the vehicle's brake system drops to a predetermined level. In a preferred embodiment, the said predetermined pressure level of the said fluid within the vehicle's brake system at which said accelerator pedal control module is configured to begin sending said instructions to the operator-independent accelerator pedal position-adjusting device is determined in correlation with the said measured angle of inclination. In yet another preferred embodiment, the accelerator pedal control module is configured to send signals to move the operator-independent accelerator pedal position-adjusting device to its idle position once the pressure of the said fluid within the vehicle's brake system reaches a predetermined level.

Still in another feature, the said anti-rollback control system further comprises at least one sensor for generating a signal indicative of the speed of said vehicle and sending signals accordingly to said accelerator pedal control module, with said accelerator pedal control module being configured for processing the received signals, along with said signals received from said tilt sensor and said sensor for detecting the selected operating mode of the transmission system, and sending instructions accordingly to the said operator-independent accelerator pedal position-adjusting device. In a preferred embodiment, the accelerator pedal control module is configured to send the said instructions when the speed of the vehicle is below a predetermined speed, and stops sending the said instructions once the speed of the vehicle exceeds the said predetermined speed.

In yet another feature, the vehicle's maximum loading weight is being taken into account while processing said received signals by said accelerator pedal control module.

In still another feature, the said anti-rollback control system further comprises at least one weight measuring device that measures the weight of said vehicle and sends signals accordingly to said accelerator pedal control module, with said accelerator pedal control module being configured for processing the received signals, along with said signals received from said tilt sensor and said sensor for detecting the selected operating mode of the transmission system, and sending instructions accordingly to the said operator-independent accelerator pedal position-adjusting device. In a preferred embodiment, the said weight measuring device is one, or more than one, load cell positioned at any point underneath the vehicle's body.

Also, in another feature, the said accelerator pedal control module is a multi-task module. In yet another feature, the said signals generated by the tilt sensor and received by the accelerator pedal control module are repeated at equal intervals, to accommodate for any changes in the signals generated by any of the other before mentioned sensors.

In a preferred embodiment, the said operator-independent accelerator pedal position-adjusting device includes: a cam and follower mechanism; and a stepper motor, with the said follower being incorporated within a movable component of the accelerator pedal assembly so that the movement of the follower is directly transmitted to the movable component(s) of the accelerator pedal assembly, and with the movement of the said cam and follower mechanism, and hence the movement of the movable component(s) of the accelerator pedal assembly, being controlled by the said stepper motor in accordance with said instructions sent by said accelerator pedal control module.

In a preferred embodiment, the said anti-rollback control system of the present invention is used to prevent undesired rolling of a motor vehicle on launching it on an incline, wherein the amount of fuel supplied to the ICE and/or the amount of electric power delivered to the electric motor of the said vehicle, and hence the amount of mechanical power generated by its powertrain, is a function of the position of a movable component of the vehicle's accelerator pedal assembly. In this preferred embodiment, the anti-rollback control system is constructed so that the said component of the accelerator pedal assembly is movable by the operator-independent accelerator pedal position-adjusting device of the anti-rollback control system, in accordance with said instructions sent by said accelerator pedal control module. Accordingly, in this preferred embodiment, the operator-independent accelerator pedal position-adjusting device of the said anti-rollback control system includes: a cam and follower mechanism; and a stepper motor, with the said follower being incorporated within the said movable component of the accelerator pedal assembly so that the movement of the follower is directly transmitted to the said component, and with the movement of the said cam and follower mechanism, and hence the movement of the said movable component of the accelerator pedal assembly, being controlled by the said stepper motor in accordance with said instructions sent by said accelerator pedal control module.

The anti-rollback control system of the present invention is applicable to any motor vehicle having an automatic transmission or an automated transmission regardless of the type of accelerator pedal included in it. Accordingly, in a preferred embodiment, the said accelerator pedal is a pendant-type accelerator pedal. In another preferred embodiment, the said accelerator pedal is an organ-type accelerator pedal.

Also, the anti-rollback control system of the present invention is functional for preventing undesired backward rolling of said vehicle on beginning or resuming its forward movement after stopping the said vehicle on an uphill incline, as well as preventing undesired forward rolling of said vehicle on beginning or resuming its backward movement after stopping the said vehicle on a downhill incline.

In another feature, the anti-rollback control system of the present invention is operable for preventing undesired rolling of a motor vehicle having an automatic transmission or an automated transmission on beginning or resuming the movement of said vehicle after stopping it on anyone of a number of inclines, with each of the said inclines having a different angle of inclination. In a preferred embodiment, each individual angle of inclination measured by the said tilt sensor, on operating the vehicle on each of the said inclines, is being correlated with a different set of instructions sent by said accelerator pedal control module. In another preferred embodiment, the angles of inclinations of the said inclines are functionally grouped into at least one range of angles, with each individual angle of inclination measured by the said tilt sensor, on operating the vehicle on each of the said inclines, being correlated with a predetermined set of instructions sent by said accelerator pedal control module based on the range of angles within which said measured angle of inclination lies.

The present invention also provides a method for preventing undesired rolling of a motor vehicle having a powertrain which includes an ICE (internal combustion engine) and/or an electric motor, and an automatic or an automated transmission system, with the amount of fuel supplied to said ICE and/or the amount of electric power delivered to said electric motor, and hence the amount of mechanical power generated by said powertrain, being a function of the position of at least one movable component of an accelerator pedal assembly, and with the said method being operable for preventing undesired rolling of the said vehicle in a direction opposite to an intended direction of vehicle movement on beginning or resuming the movement of the said vehicle after stopping the vehicle on an incline. Said method comprises: providing operator-independent accelerator pedal position-adjusting device that includes a stepper motor, and that is operable to cause controlled movement of at least one movable component of the vehicle's accelerator pedal assembly in response to and in accordance with instructions received from a control module; measuring the angle of inclination of the vehicle's longitudinal axis with reference to the horizontal plane and generating signals accordingly; detecting the selected operating mode of said transmission system and generating signals accordingly; processing said generated signals; and sending instructions accordingly to the said provided operator-independent accelerator pedal position-adjusting device to move the said at least one movable component of the vehicle's accelerator pedal assembly to a predetermined position according to which a predetermined corresponding amount of mechanical power is generated by the vehicle's powertrain, with said predetermined amount of mechanical power being sufficient to create a force, in the intended direction of movement of the vehicle, equivalent to, or bigger than, the gravitational force tending to roll the vehicle in a direction opposite to the intended direction of vehicle movement.

In one feature, the said method further comprises detecting the position of the vehicle's brake pedal and generating signals accordingly, with said generated signals being processed along with said signals generated in correlation with said measured angle of inclination of the vehicle and said signals generated in correlation with said selected operating mode of the transmission system, and with said sent instructions being configured accordingly.

In another feature, the said method further comprises detecting the pressure within the vehicle's brake system and generating signals accordingly, with said generated signals being processed along with said signals generated in correlation with said measured angle of inclination of the vehicle and said signals generated in correlation with said selected operating mode of the transmission system, and with said sent instructions being configured accordingly.

In yet another feature, the said method further comprises measuring the speed of the said vehicle and generating signals accordingly, with said generated signals being processed along with said signals generated in correlation with said measured angle of inclination of the vehicle and said signals generated in correlation with said selected operating mode of the transmission system, and with said sent instructions being configured accordingly.

In still another feature, the said method further comprises measuring the weight of the vehicle and generating signals accordingly, with said generated signals being processed along with said signals generated in correlation with said measured angle of inclination of the vehicle and said signals generated in correlation with said selected operating mode of the transmission system, and with said sent instructions being configured accordingly.

As shown in FIG. 1, which is a functional block diagram of a vehicle including a preferred embodiment of an anti-rollback control system in accordance with the present invention, the powertrain of the vehicle in which the anti-rollback control system is used includes an ICE (Engine) and/or an electric motor (Motor), and an automatic transmission (Transmission). In this embodiment, the anti-rollback control system comprises: a Tilt Sensor; a sensor that detects the selected operating mode of the transmission system (not shown in the drawing for simplicity); an operator-independent accelerator pedal (13) position-adjusting device (14); and an Accelerator Pedal Control Module.

Accordingly, on beginning or resuming the movement of the said vehicle after stopping it on an incline, the Tilt Sensor measures the angle of inclination of the vehicle's longitudinal axis with reference to the horizontal plane and sends signals (11) accordingly to the Accelerator Pedal Control Module, and the sensor that detects the selected operating mode of the transmission system detects the selected operating mode and sends signals (12) accordingly to the Accelerator Pedal Control Module, with the Accelerator Pedal Control Module being configured for receiving the signals (11, 12) generated by the tilt sensor and the sensor for detecting the selected operating mode of the transmission system, processing said received signals, and sending instructions (15) accordingly to the said operator-independent accelerator pedal position-adjusting device (14) to move at least one movable component of the vehicle's accelerator pedal assembly to a predetermined position according to which a preset amount of fuel is supplied to the Engine and/or a preset amount of electric power is delivered to the Motor, and hence a preset amount of mechanical power is generated by said powertrain, with said preset amount of mechanical power being sufficient to create a force, in the intended direction of movement of the vehicle, equivalent to, or bigger than, the gravitational force tending to roll the vehicle in a direction opposite to the intended direction of vehicle movement.

Figure 2:
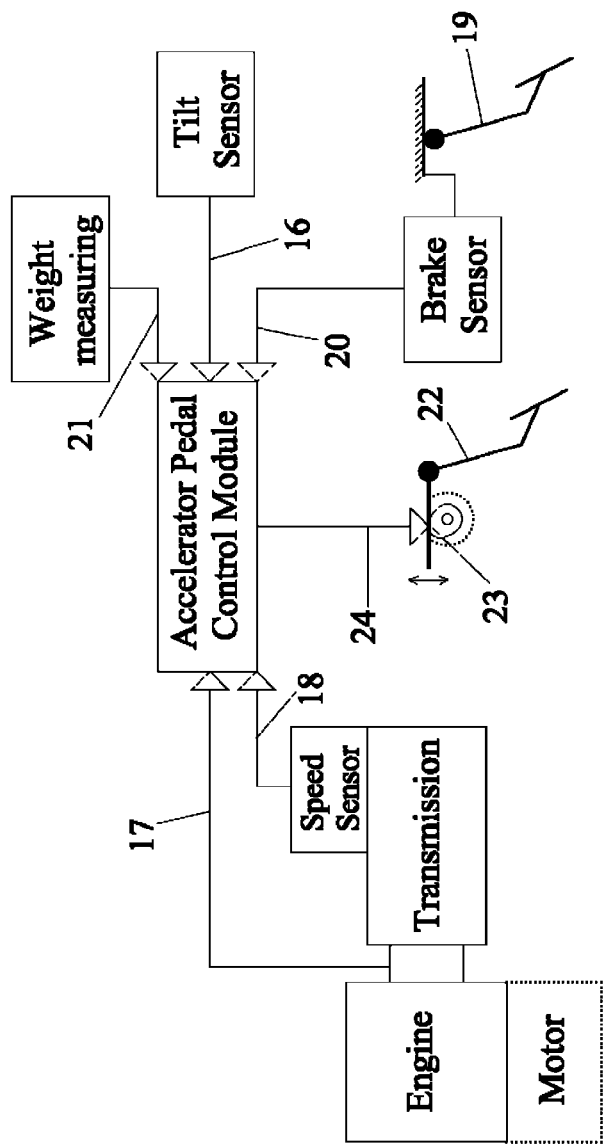
FIG. 2 is a functional block diagram of a vehicle including another preferred embodiment of an anti-rollback control system in accordance with the present invention.

And as shown in FIG. 2, which is a functional block diagram of a vehicle including another preferred embodiment of an anti-rollback control system in accordance with the present invention, the powertrain of the vehicle in which the anti-rollback control system is used includes an ICE (Engine) and/or an electric motor (Motor), and a Transmission, with said transmission being either and automatic or an automated transmission. In this embodiment, the anti-rollback control system comprises: a Tilt Sensor; a sensor that detects the selected operating mode of the transmission system (not shown in the drawing for simplicity); a Speed Sensor; a Brake Sensor; a weight measuring device; an operator-independent accelerator pedal (22) position-adjusting device (23); and an Accelerator Pedal Control Module.

Accordingly, on beginning or resuming the movement of the said vehicle after stopping it on an incline, the Tilt Sensor measures the angle of inclination of the vehicle's longitudinal axis with reference to the horizontal plane and sends signals (16) accordingly to the Accelerator Pedal Control Module, the sensor that detects the selected operating mode of the transmission system detects the selected operating mode and sends signals (17) accordingly to the Accelerator Pedal Control Module, the Speed Sensor measures the speed of the vehicle and sends signals (18) accordingly to the Accelerator Pedal Control Module, the Brake Sensor detects either the position of the brake pedal (19), or the pressure of a working fluid within the vehicle's brake system and sends signals (20) accordingly to the Accelerator Pedal Control Module, and the weight measuring device measures the weight of the vehicle and sends signals (21) accordingly to the Accelerator Pedal Control Module, with the Accelerator Pedal Control Module being configured for receiving the signals (16, 17, 18, 20, 21) generated by the before mentioned sensors and devices, processing said received signals, and sending instructions (24) accordingly to the said operator-independent accelerator pedal position-adjusting device (23) to adjust the position of the said movable component(s) of the accelerator pedal assembly as described herein above.

The preferred embodiment of FIG. 2 is adapted for use in a hybrid or a conventional vehicle having an automated transmission system, in which the driven mechanism is disengaged from the driving mechanism when the vehicle stops, as it enables correlating the movement of the accelerator pedal with the operation of the vehicle's braking system, and hence, when the brake pedal is fully depressed, leading to complete stopping of the vehicle and disengagement of the vehicle's driven mechanism from its driving mechanism, the anti-rollback control system is inactivated with the accelerator pedal being maintained at its idle position, and when the vehicle operator starts to release the brake pedal the anti-rollback control system senses this action, either directly through a brake pedal position sensor or indirectly through measuring the pressure of a working fluid within the vehicle's brake system, and initiates the movement of the movable component(s) of the accelerator pedal assembly, as described herein above.

Also, as the movement of the movable component(s) of the accelerator pedal assembly, and hence the increase in the amount of mechanical power generated by the powertrain, is correlated with the gross weight of the vehicle, so the overall vehicle's fuel consumption on operating the vehicle on an incline is brought down to a minimum. The use of the speed sensor in this preferred embodiment enables preventing the premature activation of the anti-rollback control system when the vehicle is cruising at, or above, a predetermined speed, with said speed being selected to suffice preventing the rollback of the vehicle on the incline, and hence increasing the service life of the system.

Figure 3:
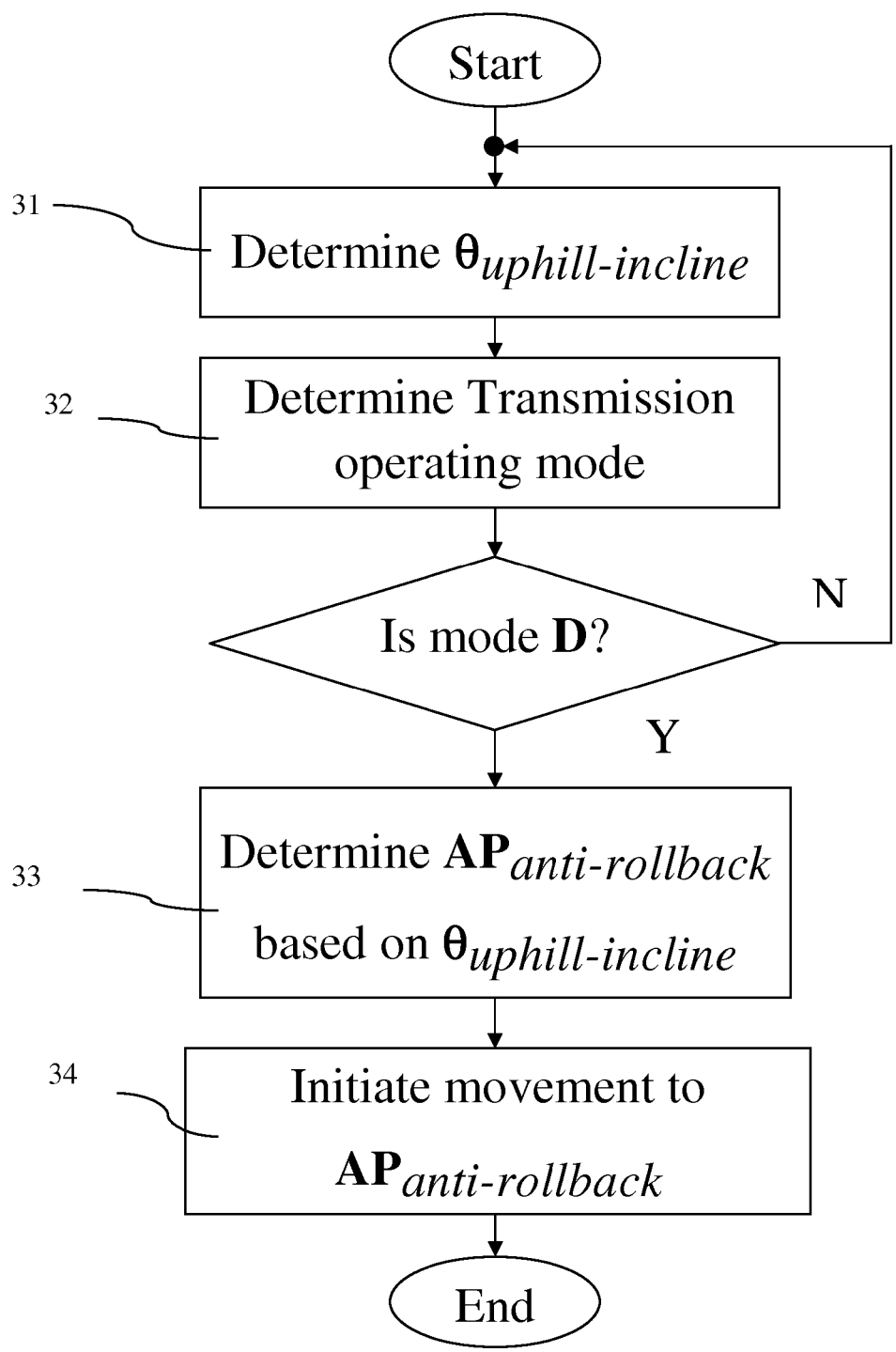
FIG. 3 is a flowchart illustrating exemplary steps executed by an accelerator pedal control module in accordance with the present invention.

FIG. 3 is a flowchart illustrating exemplary steps executed by an accelerator pedal control module in accordance with the present invention, with said accelerator pedal control module being adapted for use in a vehicle having a powertrain including an ICE and/or an electric motor, and an automatic transmission, to prevent undesired backward rolling of the vehicle on beginning or resuming its movement after stopping it on an uphill incline.

Accordingly, in step 31, the control module determines the uphill angle of inclination $\theta_{uphill-incline}$, based on the signals received from a tilt sensor. In step 32, the control module determines the transmission's operating mode selected by the vehicle's operator. If the selected operating mode is not D, control module loops back to step 31. If the selected operating mode is D, control module determines the position of the Accelerator Pedal needed to prevent backward rolling of the vehicle $AP_{anti-rollback}$ based on $\theta_{uphill-incline}$, which is shown in step 33. In step 34, the control module sends signals to the operator-independent accelerator pedal position-adjusting device to initiate Accelerator Pedal movement to $AP_{anti-rollback}$ position and control ends.

FIG. 4-a and FIG. 4-b are flowcharts illustrating exemplary steps executed by the layers of a multi-task accelerator pedal control module in accordance with the present invention, with said accelerator pedal control module being adapted for use in a vehicle having a powertrain including an ICE and/or an electric motor, and an automatic transmission, to prevent undesired backward rolling of the vehicle on beginning or resuming its forward movement after stopping it on an uphill incline, and to prevent undesired forward rolling of the vehicle on beginning or resuming its backward movement after stopping it on a downhill incline.

In this exemplary embodiment, a multi-task, double-layered accelerator pedal control module is employed, with one of its layers ($L_1$), which is shown in FIG. 4-a, being configured to operate when the angle of inclination measured by the tilt sensor indicates positioning of the vehicle on an uphill incline, i.e. $\theta_{uphill-incline}$, and the selected transmission's operating mode is D, and with the other layer ($L_2$), which is shown in FIG. 4-b, being configured to operate when the angle of inclination measured by the tilt sensor indicates positioning of the vehicle on a downhill incline, i.e. $\theta_{downhill-incline}$, and the selected transmission's operating mode is R.

Accordingly as shown in FIG. 4-a, on positioning the vehicle on an uphill incline, the first layer ($L_1$) of the control module is activated as follows. In step 41, the first layer ($L_1$) of the control module determines the uphill angle of inclination $\theta_{uphill-incline}$, based on the signals received from a tilt sensor. In step 42, the control module determines the transmission's operating mode selected by the vehicle's operator. If the selected operating mode is not D, control module loops back to step 41. If the selected operating mode is D, control module determines the weight of the vehicle W based on signals received from a weight measuring device, which is shown in step 43. In step 44 the control module calculates the position of the Accelerator Pedal needed to prevent backward rolling of the vehicle $AP_{anti-rollback}$, based on W and $\theta_{uphill-incline}$. In step 45, the control module sends signals to the said operator-independent accelerator pedal position-adjusting device to initiate Accelerator Pedal movement to $AP_{anti-rollback}$ position and control ends.

And as shown in FIG. 4-b, on positioning the vehicle on a downhill incline, the second layer ($L_2$) of the control module is activated as follows. In step 46, the second layer ($L_2$) of the control module determines the downhill angle of inclination $\theta_{downhill-incline}$, based on the signals received from a tilt sensor. In step 47, the control module determines the transmission's operating mode selected by the vehicle's operator. If the selected operating mode is not R, control module loops back to step 46. If the selected operating mode is R, control module determines the weight of the vehicle W based on signals received from a weight measuring device, which is shown in step 48. In step 49 the control module calculates the position of the Accelerator Pedal needed to prevent forward rolling of the vehicle $AP_{anti-rollback}$, based on W and $\theta_{downhill-incline}$. In step 50, the control module sends signals to the said operator-independent accelerator pedal position-adjusting device to initiate Accelerator Pedal movement to $AP_{anti-rollback}$ position and control ends.

FIG. 5-a, FIG. 5-b, and FIG. 5-c are flowcharts illustrating exemplary steps executed by the layers of another multi-task accelerator pedal control module in accordance with the present invention, with said accelerator pedal control module being adapted for use in a hybrid or conventional vehicle having a powertrain including an ICE and/or an electric motor, and an automated or automatic transmission, to prevent undesired backward rolling of the vehicle on beginning or resuming its forward movement after stopping it on an uphill incline, and to prevent undesired forward rolling of the vehicle on beginning or resuming its backward movement after stopping it on a downhill incline.

In this exemplary embodiment, a multi-task, three-layered accelerator pedal control module is employed, with one of its layers ($L_1$), which is shown in FIG. 5-a, being configured to operate when the angle of inclination measured by the tilt sensor indicates positioning of the vehicle on an uphill incline, i.e. $\theta_{uphill-incline}$, and the selected transmission's operating mode is D, and with another layer ($L_2$), which is shown in FIG. 5-b, being configured to operate when the angle of inclination measured by the tilt sensor indicates positioning of the vehicle on an downhill incline, i.e. $\theta_{downhill-incline}$, and the selected transmission's operating mode is R. The third layer ($L_3$), which is shown in FIG. 5-c, is configured to operate when the brake pedal is fully depressed with the pressure of a working fluid within the vehicle's brake system being above a threshold level $P_{min}$.

Accordingly as shown in FIG. 5-a, on positioning the vehicle on an uphill incline, the first layer ($L_1$) of the control module is activated as follows. In step 51, the first layer ($L_1$) of the control module determines the uphill angle of inclination $\theta_{uphill-incline}$, based on the signals received from a tilt sensor. In step 52, the control module determines the transmission's operating mode selected by the vehicle's operator. If the selected operating mode is not D, control module loops back to step 51. If the selected operating mode is D, control module determines the speed of the vehicle S based on signals received from a speed sensor, which is shown in step 53. If the speed of the vehicle S is more than a threshold speed $S_{min}$, control module loops back to step 51. If the speed of the vehicle is $\leq S_{min}$, control module determines the pressure of the said fluid within the vehicle's brake system P based on signals received from a pressure sensor, which is shown in step 54. If the pressure level is higher than a threshold level $P_{min}$, control module loops back to step 51. If the pressure level is $\leq P_{min}$, control module determines the position of the Accelerator Pedal needed to prevent backward rolling of the vehicle $AP_{anti-rollback}$, based on $\theta_{uphill-incline}$, which is shown in step 55. In step 56, the control module sends signals to the operator-independent accelerator pedal position-adjusting device to initiate Accelerator Pedal movement to $AP_{anti-rollback}$ position and control ends.

And as shown in FIG. 5-b, on positioning the vehicle on a downhill incline, the second layer ($L_2$) of the control module is activated as follows. In step 57, the second layer ($L_2$) of the control module determines the downhill angle of inclination $\theta_{downhill-incline}$, based on the signals received from a tilt sensor. In step 58, the control module determines the transmission's operating mode selected by the vehicle's operator. If the selected operating mode is not R, control module loops back to step 57. If the selected operating mode is R, control module determines the speed of the vehicle S based on signals received from a speed sensor, which is shown in step 59. If the speed of the vehicle S is more than a threshold speed $S_{min}$, control module loops back to step 57. If the speed of the vehicle is $\leq S_{min}$, control module determines the pressure of the said fluid within the vehicle's brake system P based on signals received from a pressure sensor, which is shown in step 60. If the pressure level is higher than a threshold level $P_{min}$, control module loops back to step 57. If the pressure level is $\leq P_{min}$, control module determines the position of the Accelerator Pedal needed to prevent forward rolling of the vehicle $AP_{anti-rollback}$, based on $O_{downhill-incline}$, which is shown in step 61. In step 62, the control module sends signals to the operator-independent accelerator pedal position-adjusting device to initiate Accelerator Pedal movement to $AP_{anti-rollback}$ position and control ends.

And as shown in FIG. 5-c, when the brake pedal is fully depressed by the vehicle operator, the third layer ($L_3$) of the control module is activated as follows. In step 63, the third layer ($L_3$) of the control module determines the pressure of the said fluid within the vehicle's brake system P based on signals received from a pressure sensor. If the pressure level is less than a threshold level $P_{min}$, control module loops back to the same step. If the pressure level is $>P_{min}$, the control module sends signals to the operator-independent accelerator pedal position-adjusting device to initiate Accelerator Pedal movement to idle position $AP_{idle}$, which is shown in step 64, and control ends.

FIG. 6 shows a functional block diagram of a pendant-type accelerator pedal (71) in a plurality of exemplary operating positions, in accordance with the anti-rollback control system of the present invention; wherein said anti-rollback control system includes an operator-independent accelerator pedal position-adjusting device and an accelerator pedal control module.

In this exemplary embodiment, the operator-independent accelerator pedal position-adjusting device comprises: a cam (72) and follower (73) mechanism; and a stepper motor (74), with the said follower (73) being incorporated within a movable component of the accelerator pedal assembly (71) so that the movement of the follower is directly transmitted to the accelerator pedal, and with the movement of the said cam and follower mechanism (72, 73), and hence the movement of the movable component(s) of the accelerator pedal assembly (71), being controlled by the said stepper motor (74) in accordance with instructions sent by said accelerator pedal control module. The movement of the accelerator pedal (71) ranges between an idle position (FIG. 6-a) and an operator-controlled fully depressed position (FIG. 6-d).

As shown in this figure, the operating range of the accelerator pedal (71) is functionally divided into two portions: a first anti-rollback control system influenced portion, which is the portion between the position of the accelerator pedal in FIG. 6-a and FIG. 6-c; and a second operator-controlled portion, which is the portion between the position of the accelerator pedal in FIG. 6-c and FIG. 6-d, noting that using a cam (72) and follower (73) mechanism allows the operator to fully control the whole operating range of the accelerator pedal when the anti-rollback control system is idle.

And hence, on beginning or resuming the movement of the vehicle on an incline, the accelerator pedal control module sends instructions to the stepper motor (74), to move the cam and follower mechanism (72, 73), and hence the accelerator pedal (71), to a predetermined position, lying anywhere between the position of the accelerator pedal in FIG. 6-a and its position in FIG. 6-c, according to which a preset amount of mechanical power is generated by the vehicle's powertrain, with said preset amount of mechanical power being sufficient to create a force, in the intended direction of movement of the vehicle, equivalent to, or bigger than, the gravitational force tending to roll the vehicle in a direction opposite to the intended direction of vehicle movement.

Once the operator starts to press the accelerator pedal (71), the cam and follower mechanism (72, 73) is disengaged, with the operator gaining full control of the accelerator pedal (71), as shown in (FIG. 6-d). Also, once the vehicle reaches a horizontal plane, the accelerator pedal control module sends instructions to the stepper motor (74) to move the cam and follower mechanism (72, 73) to idle position (FIG. 6-a), so that the operator gains full control of the whole operating range of the accelerator pedal (71).

Figure 7:
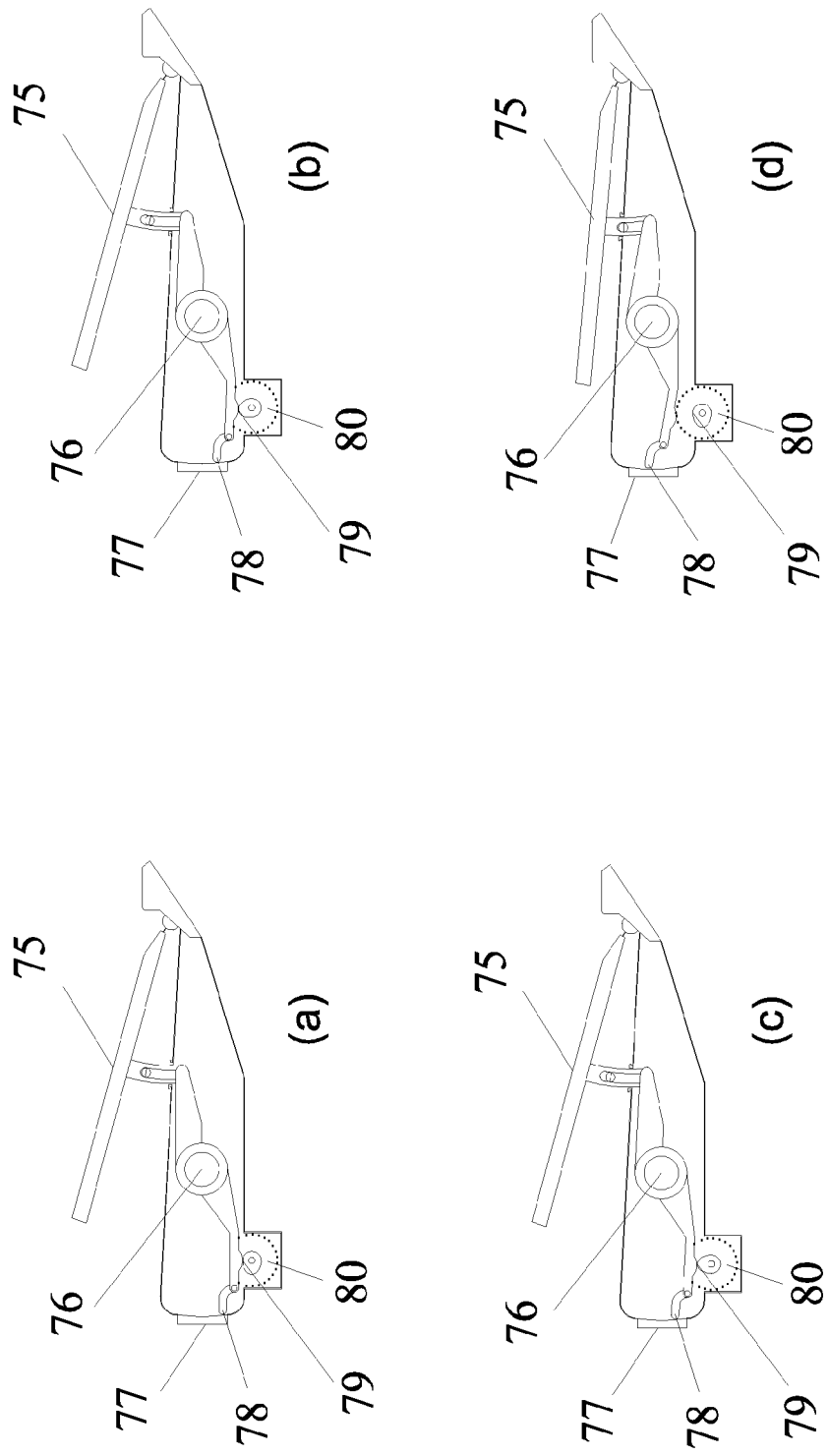
FIG. 7 is a functional block diagram of an organ-type accelerator pedal in a plurality of exemplary operating positions in accordance with the anti-rollback control system of the present invention.

Also, FIG. 7 shows a functional block diagram of an organ-type accelerator pedal (75) in a plurality of exemplary operating positions, in accordance with the anti-rollback control system of the present invention; wherein said anti-rollback control system includes an operator-independent accelerator pedal position-adjusting device and an accelerator pedal control module.

In this exemplary embodiment, the accelerator pedal assembly (76) includes a position sensor (77) having a movable member (78), with the amount of fuel supplied to the vehicle's ICE and/or the amount of electric power delivered to the vehicle's electric motor, and hence the amount of mechanical power generated by the vehicle's powertrain being a function of the position of the movable member (78), and with the position of the movable member (78) being influenced by the operator-independent accelerator pedal position-adjusting device in accordance with instructions sent by said accelerator pedal control module.

Also, in this embodiment, the operator-independent accelerator pedal position-adjusting device comprises: a cam and follower mechanism (79); and a stepper motor (80), with the said follower being incorporated within the said accelerator pedal assembly (76) so that the movement of the follower is directly transmitted to the movable member (78), and with the movement of the said cam and follower mechanism (79), and hence the movement of the movable member (78), being controlled by the said stepper motor (80) in accordance with instructions sent by said accelerator pedal control module. The movement of the movable member (78) ranges between an idle position (FIG. 7-a) and an operator-controlled fully depressed position (FIG. 7-d).

As shown in this figure, the operating range of the accelerator pedal (75) is functionally divided into two portions: a first anti-rollback control system influenced portion, which is the portion between the position of the accelerator pedal in FIG. 7-a and FIG. 7-c; and a second operator-controlled portion, which is the portion between the position of the accelerator pedal in FIG. 7-c and FIG. 7-d, noting that cam and follower mechanism (79) allows the operator to fully control the whole operating range of the accelerator pedal when the anti-rollback control system is idle.

And hence, on beginning or resuming the movement of the vehicle on an incline, the accelerator pedal control module will send instructions to the stepper motor (80), to move the cam and follower mechanism (79), and hence the movable member (78), to a predetermined position, lying anywhere between the position of the movable member in FIG. 7-a and its position in FIG. 7-c, according to which a preset amount of mechanical power is generated by the vehicle's powertrain, with said preset amount of mechanical power being sufficient to create a force, in the intended direction of movement of the vehicle, equivalent to, or bigger than, the gravitational force tending to roll the vehicle in a direction opposite to the intended direction of vehicle movement.

Once the operator starts to press the accelerator pedal (75), the cam and follower mechanism (79) is disengaged, with the operator gaining full control of the accelerator pedal (76), as shown in (FIG. 7-d). Also, once the vehicle reaches a horizontal plane, the accelerator pedal control module sends instructions to the stepper motor (80) to move the cam and follower mechanism (79) to idle position (FIG. 7-a), so that the operator gains full control of the whole operating range of the accelerator pedal (76).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. In a motor vehicle having a powertrain that includes an automatic or an automated transmission system, an anti-rollback control system for preventing undesired rolling of the said vehicle in a direction opposite to an intended direction of vehicle movement on beginning or resuming the movement of the vehicle after stopping the vehicle on an incline, said anti-rollback control system comprises: at least one tilt sensor that measures the angle of inclination of the vehicle's longitudinal axis with reference to the horizontal plane and generates signals accordingly; at least one sensor for detecting a selected operating mode of the vehicle's transmission system and generating signals accordingly; an accelerator pedal control module; and an operator-independent accelerator pedal position-adjusting device that includes a stepper motor, and that is operable to cause controlled movement of at least one movable component of the vehicle's accelerator pedal assembly in response to and in accordance with instructions received from the said accelerator pedal control module, with the accelerator pedal control module being constructed and configured for receiving the signals generated by the said at least one tilt sensor and the said at least one sensor for detecting the selected operating mode of the transmission system, processing said received signals, and sending instructions accordingly to the said operator-independent accelerator pedal position-adjusting device to move the said at least one movable component of the vehicle's accelerator pedal assembly to a predetermined position according to which a predetermined corresponding amount of mechanical power is generated by the vehicle's powertrain, with said predetermined amount of mechanical power being sufficient to create a force, in the intended direction of movement of the vehicle, equivalent to, or bigger than, the gravitational force tending to roll the vehicle in a direction opposite to the intended direction of vehicle movement.

2. The anti-rollback control system of claim 1, which further comprises at least one sensor that detects the position of the vehicle's brake pedal and sends signals accordingly to said accelerator pedal control module, with said accelerator pedal control module being configured to begin sending said instructions to the said operator-independent accelerator pedal position-adjusting device once the brake pedal reaches a predetermined position.

3. The anti-rollback control system of claim 2, wherein the said predetermined brake pedal position at which said accelerator pedal control module is configured to begin sending said instructions to the said operator-independent accelerator pedal position-adjusting device is determined in correlation with the said measured angle of inclination.

4. The anti-rollback control system of claim 2, wherein the accelerator pedal control module is further configured to send signals to move the said operator-independent accelerator pedal position-adjusting device to its idle position once the brake pedal reaches a predetermined position.

5. The anti-rollback control system of claim 1, which further comprises at least one sensor that detects the pressure of a working fluid within the vehicle's brake system at at least one point and sends signals accordingly to said accelerator pedal control module, with said accelerator pedal control module being configured to begin sending the said instructions to the said operator-independent accelerator pedal position-adjusting device once the pressure of the said fluid within the vehicle's brake system drops to a predetermined level.

6. The anti-rollback control system of claim 5, wherein the said predetermined pressure level of the said fluid within the vehicle's brake system at which said accelerator pedal control module is configured to begin sending said instructions to the said operator-independent accelerator pedal position-adjusting device is determined in correlation with the said measured angle of inclination.

7. The anti-rollback control system of claim 5, wherein the accelerator pedal control module is further configured to send signals to move the said operator-independent accelerator pedal position-adjusting device to its idle position once the pressure of the said fluid within the vehicle's brake system reaches a predetermined level.

8. The anti-rollback control system of claim 1, wherein the vehicle's maximum loading weight is being taken into account while processing said received signals by said accelerator pedal control module.

9. The anti-rollback control system of claim 1, which further comprises at least one sensor for generating a signal indicative of a speed of said vehicle and sending signals accordingly to said accelerator pedal control module, with said accelerator pedal control module being configured for processing the received signals, along with said signals received from said tilt sensor and said sensor for detecting the selected operating mode of the transmission system, and sending instructions accordingly to the said operator-independent accelerator pedal position-adjusting device.

10. The anti-rollback control system of claim 1, which further comprises at least one weight measuring device that measures the weight of said vehicle and sends signals accordingly to said accelerator pedal control module, with said accelerator pedal control module being configured for processing the received signals, along with said signals received from said tilt sensor and said sensor for detecting the selected operating mode of the transmission system, and sending instructions accordingly to the said operator-independent accelerator pedal position-adjusting device.

11. The anti-rollback control system of claim 10, wherein the said weight measuring device is a load cell.

12. The anti-rollback control system of claim 1, wherein the said operator-independent accelerator pedal position-adjusting device further includes a cam and follower mechanism, with the said follower being incorporated within a movable component of the vehicle's accelerator pedal assembly so that the movement of the follower is directly transmitted to at least one movable component of the accelerator pedal assembly, and with the movement of the said cam and follower mechanism being controlled by the said stepper motor in accordance with said instructions sent by said accelerator pedal control module.

13. The anti-rollback control system of claim 1, wherein the said predetermined amount of mechanical power generated by said powertrain is a function of the position of a movable component of the vehicle's accelerator pedal assembly, with the said component being movable by said operator-independent accelerator pedal position-adjusting device in accordance with said instructions sent by said accelerator pedal control module.

14. The anti-rollback control system of claim 13, wherein the said operator-independent accelerator pedal position-adjusting device further includes a cam and follower mechanism, with the said follower being incorporated within the said movable component of the vehicle's accelerator pedal assembly so that the movement of the follower is directly transmitted to the said movable component, and with the movement of the said cam and follower mechanism being controlled by the said stepper motor in accordance with said instructions sent by said accelerator pedal control module.

15. The anti-rollback control system of claim 1, wherein said signals generated by said tilt sensor and received by said accelerator pedal control module are repeated at equal intervals.

16. The anti-rollback control system of claim 1, wherein the accelerator pedal control module is a multi-task module.

17. The anti-rollback control system of claim 1, wherein the vehicle's accelerator pedal is a pendant-type accelerator pedal.

18. The anti-rollback control system of claim 1, wherein the vehicle's accelerator pedal is an organ-type accelerator pedal.

19. The anti-rollback control system of claim 1, which is functional for preventing undesired backward rolling of said vehicle on beginning or resuming its forward movement after stopping the said vehicle on an uphill incline.

20. The anti-rollback control system of claim 1, which is functional for preventing undesired forward rolling of said vehicle on beginning or resuming its backward movement after stopping the said vehicle on a downhill incline.

21. The anti-rollback control system of claim 1, which is operable for preventing undesired rolling of said vehicle on anyone of a number of inclines, with each of the said inclines having a different angle of inclination, wherein each individual angle of inclination measured by the said tilt sensor, on operating the vehicle on each of the said inclines, is being correlated with a different set of instructions sent by said accelerator pedal control module.

22. The anti-rollback control system of claim 1, which is operable for preventing undesired rolling of said vehicle on anyone of a number of inclines, with each of the said inclines having a different angle of inclination, and with the angles of inclinations of the said inclines being functionally grouped into at least one range of angles, wherein each individual angle of inclination measured by the said tilt sensor, on operating the vehicle on each of the said inclines, is being correlated with a predetermined set of instructions sent by said accelerator pedal control module based on the range of angles within which said measured angle of inclination lies.

23. In a motor vehicle having a powertrain that includes an automatic or an automated transmission system, a method for preventing undesired rolling of said vehicle in a direction opposite to an intended direction of vehicle movement on beginning or resuming the movement of the vehicle after stopping the vehicle on an incline, said method comprises: providing an operator-independent accelerator pedal position-adjusting device that includes a stepper motor, and that is operable to cause controlled movement of at least one movable component of the vehicle's accelerator pedal assembly in response to and in accordance with instructions received from a control module; measuring the angle of inclination of the vehicle's longitudinal axis with reference to the horizontal plane and generating signals accordingly; detecting the selected operating mode of the vehicle's transmission system and generating signals accordingly; processing said generated signals; and sending instructions accordingly to the said operator-independent accelerator pedal position-adjusting device to move the said at least one movable component of the vehicle's accelerator pedal assembly to a predetermined position according to which a predetermined corresponding amount of mechanical power is generated by the vehicle's powertrain, with said predetermined amount of mechanical power being sufficient to create a force, in the intended direction of movement of the vehicle, equivalent to, or bigger than, the gravitational force tending to roll the vehicle in a direction opposite to the intended direction of vehicle movement.

24. The method of claim 23, which further comprises detecting the position of the vehicle's brake pedal and generating signals accordingly, with said generated signals being processed along with said signals generated in correlation with said measured angle of inclination of the vehicle and said signals generated in correlation with said selected operating mode of the transmission system, and with said sent instructions being configured accordingly.

25. The method of claim 23, which further comprises detecting the pressure within the vehicle's brake system and generating signals accordingly, with said generated signals being processed along with said signals generated in correlation with said measured angle of inclination of the vehicle and said signals generated in correlation with said selected operating mode of the transmission system, and with said sent instructions being configured accordingly.

26. The method of claim 23, which further comprises measuring the speed of the said vehicle and generating signals accordingly, with said generated signals being processed along with said signals generated in correlation with said measured angle of inclination of the vehicle and said signals generated in correlation with said selected operating mode of the transmission system, and with said sent instructions being configured accordingly.

27. The method of claim 23, which further comprises measuring the weight of the vehicle and generating signals accordingly, with said generated signals being processed along with said signals generated in correlation with said measured angle of inclination of the vehicle and said signals generated in correlation with said selected operating mode of the transmission system, and with said sent instructions being configured accordingly.

* * * * *